US012675289B2

(12) United States Patent
Styliadis

(10) Patent No.: US 12,675,289 B2
(45) Date of Patent: Jul. 7, 2026

(54) SYSTEM FOR IDENTIFYING SAME OR SIMILAR INSTANCES OF SOURCE CODE

(71) Applicant: Endor Labs Inc, Palo Alto, CA (US)

(72) Inventor: Dimitrios Styliadis, San Jose, CA (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

(21) Appl. No.: 19/234,327

(22) Filed: Jun. 11, 2025

(65) Prior Publication Data

US 2025/0306917 A1    Oct. 2, 2025

Related U.S. Application Data

(62) Division of application No. 19/041,564, filed on Jan. 30, 2025.

(60) Provisional application No. 63/627,281, filed on Jan. 31, 2024.

(51) Int. Cl.
*G06F 9/44*        (2018.01)
*G06F 8/71*        (2018.01)
*G06F 8/75*        (2018.01)

(52) U.S. Cl.
CPC . *G06F 8/71* (2013.01); *G06F 8/75* (2013.01)

(58) Field of Classification Search
None
See application file for complete search history.

(56) References Cited

U.S. PATENT DOCUMENTS

| | | | | |
|---|---|---|---|---|
| 8,433,687 | B1 * | 4/2013 | Pydi | G06F 8/71 |
| | | | | 707/672 |
| 8,627,327 | B2 | 1/2014 | Dunshea et al. | |
| 10,108,975 | B1 | 10/2018 | Benner et al. | |
| 10,169,208 | B1 * | 1/2019 | Moyes | G06F 16/3347 |
| 10,565,377 | B1 | 2/2020 | Zheng et al. | |

(Continued)

FOREIGN PATENT DOCUMENTS

| | | |
|---|---|---|
| CN | 104321782 A | 1/2015 |
| CN | 111190641 A | 5/2020 |

(Continued)

OTHER PUBLICATIONS

BaoJiang Cui et al., "Code Comparison System Based On Abstract Syntax Tree", 2010 (Year: 2010).*

(Continued)

*Primary Examiner* — Lanny N Ung
(74) *Attorney, Agent, or Firm* — FP; Sikander M. Khan

(57)        ABSTRACT
The technology disclosed relates to a system for identifying same or similar instances of source code. In particular, the technology disclosed relates to a data repository designed for storing information regarding one or more associations between an instance of source code and a semantic hash code value. Wherein, semantic hash code value being determined in accordance with a semantic hash code algorithm. Wherein, semantic hash code algorithm being designed for computing a quantification of a set of measured characteristics of instance of source code. Wherein, quantification of set of source code characteristics of instance of source code being represented by semantic hash code value. Wherein, semantic hash code value corresponding to instance of source code. Wherein, an association between an identity of instance of source code and semantic hash code value is stored into data repository.

10 Claims, 10 Drawing Sheets

(56) References Cited

U.S. PATENT DOCUMENTS

| | | | |
|---|---|---|---|
| 10,917,415 B2 | 2/2021 | Chen | |
| 11,474,796 B1 | 10/2022 | Mather | |
| 11,586,436 B1 | 2/2023 | Jennings | |
| 11,704,099 B1 * | 7/2023 | Morse | G06F 8/751 |
| | | | 717/143 |
| 11,930,013 B1 | 3/2024 | Zhang et al. | |
| 2002/0097253 A1 | 7/2002 | Charisius et al. | |
| 2004/0168152 A1 | 8/2004 | Kramer | |
| 2005/0055565 A1 | 3/2005 | Fournet et al. | |
| 2007/0294667 A1 | 12/2007 | Caceres et al. | |
| 2013/0083030 A1 | 4/2013 | Fukuda et al. | |
| 2014/0013315 A1 | 1/2014 | Genevski et al. | |
| 2014/0173574 A1 | 6/2014 | Schmidt et al. | |
| 2015/0169320 A1 | 6/2015 | Ahmed et al. | |
| 2016/0253625 A1 | 9/2016 | Casey | |
| 2017/0206123 A1 | 7/2017 | Kirkpatrick | |
| 2017/0286099 A1 | 10/2017 | Wilkinson | |
| 2018/0018459 A1 | 1/2018 | Zhang et al. | |
| 2019/0042233 A1 | 2/2019 | Majumdar et al. | |
| 2019/0278572 A1 * | 9/2019 | Yoshida | G06F 8/75 |
| 2020/0053175 A1 | 2/2020 | Bodman et al. | |
| 2020/0073781 A1 | 3/2020 | Falko | |
| 2020/0218535 A1 * | 7/2020 | Alomari | G06F 16/9027 |
| 2021/0149667 A1 | 5/2021 | Watson et al. | |
| 2021/0173621 A1 | 6/2021 | Fender et al. | |
| 2021/0182037 A1 * | 6/2021 | Hu | G06F 8/427 |
| 2021/0281597 A1 | 9/2021 | Guiroux et al. | |
| 2022/0091842 A1 * | 3/2022 | Murray | G06F 16/245 |
| 2022/0222351 A1 | 7/2022 | Levin et al. | |
| 2022/0383995 A1 | 12/2022 | O'Rourke et al. | |
| 2023/0195901 A1 | 6/2023 | Allen | |
| 2023/0305827 A1 | 9/2023 | Dai et al. | |
| 2023/0418578 A1 * | 12/2023 | Chen | G06F 8/443 |
| 2024/0370570 A1 | 11/2024 | Betthauser et al. | |
| 2024/0411881 A1 | 12/2024 | Aday et al. | |

FOREIGN PATENT DOCUMENTS

| | | |
|---|---|---|
| CN | 112083945 A | 12/2020 |
| CN | 116089958 A | 5/2023 |
| CN | 116307697 A | 6/2023 |
| CN | 116842522 A | 10/2023 |
| CN | 117389519 A | 1/2024 |
| CN | 117556432 A | 2/2024 |
| CN | 118467790 A | 8/2024 |
| JP | 2011053966 A | 3/2011 |

OTHER PUBLICATIONS

Barthelemy Dagenais et al., SemDiff: Analysis and Recommendation Support for API Evolution, 2009 [retrieved Aug. 8, 2025], 2009 IEEE 31st International Conference on Software Engineering, pp. 599-602, downloaded from :https://ieeexplore.ieee.org. (Year: 2009).

Istvan-Attila Csaszar and Radu Razvan Slavescu (Interactive call graph generation for software projects); pp. 8; Published on IEEE in Nov. 26, 2020.

Mehdi Keshani (Scalable Call Graph Constructor for Maven); pp. 3; Published in Mar. 28, 2021.

Mehdi Keshani, Georgios Gousios and Sebastian Proksch (Frankenstein: fast and lightweight call graph generation for softwarebuilds); pp. 47; Published in Nov. 16, 2023.

\* cited by examiner

SYSTEM FOR IDENTIFYING SAME OR SIMILAR INSTANCES OF SOURCE CODE

This application is divisional of U.S. patent application Ser. No. 19/041,564, entitled "DETECTION OF PHANTOM DEPENDENCIES WITHIN A CONSTRUCTED SOFTWARE APPLICATION," filed on Jan. 30, 2025, which claims priority and benefit to a U.S. Provisional utility patent application that is identified by a Serial No: 63/627,281 and that is titled "Detection of Phantom Dependencies Within a Constructed Software Application", and that was filed with the U.S. Patent and Trademark Office (USPTO) on Jan. 31, 2024. All of the above referenced documents are herein incorporated by reference in their entirety.

FIELD OF THE INVENTION

A system and method for identifying outside software dependencies from within a software application, that are not provided by common package management software, but are instead provided through other means.

BACKGROUND OF THE INVENTION

A package manager is a software tool that is designed to install a collection of software components, that are included within software packages that are being installed via the package manager, to a computer system for the purpose of incorporating at least some of the collection of software components into a software application being developed and/or to be deployed by a software developer, and where the software developer is an organization of one or more people that is developing the software application.

Software components that are not developed by the software developer of the software application, are referred to herein as outside developed software components, or as outside (third party) supplied/developed software components, or as third-party software components. Such outside developed/supplied software components that are incorporated into the software application, are also referred to herein as software component dependencies, component dependencies, or as dependencies, in relation to that software application. Some or all of such software component dependencies can be supplied to a software application via one or more package managers.

A set of software components can be delivered (installed) by a package manager in the form of a collection (set) of files, where such files can include source code and/or data, which are also collectively referred to herein as package manager delivered (installed) files and/or artifacts. Such files (artifacts) can be delivered (installed) from a code (software) repository, that in some instantiations (circumstances), this code (software) repository can be a public repository that maintains open-source code packages.

A code (software) repository is a place where a variety of software packages are stored, and that can be accessed and acquired, by a software developer, for the purpose of building and/or deploying other software, such other software being, for example, one or more software applications. Such a code repository can typically be accessed over the Internet, and software that is supplied from the code repository can typically be acquired for little or no monetary cost, providing that any license terms, such as conditions and restrictions, if applicable, that are associated with the software to be acquired, are complied with by an acquirer of the software. Such software is also referred to herein as third-party software.

BRIEF DESCRIPTION OF THE INVENTION

A computer-implemented method for detecting software application dependencies upon software components, including abnormal dependencies and phantom dependencies upon software components, within a software application. A dependency is a software component that is incorporated into a software application, and that is supplied by an entity that is other than and outside of an organization that is developing the software application. In other words, a dependency is a software component that is not developed by the organization that is developing the software application. Such a software component can include software instructions and/or data.

Phantom dependencies are software components (dependencies) that are not expected by the organization developing the software application, to be incorporated into the software application, and can potentially and unintentionally substitute for dependencies that are expected to be incorporated into the software application and provided by a software package manager. Information indicating the actual dependencies that are required to construct the software application can be determined through static analysis of the source code of the software application. Such static analysis is also referred to herein as source code static analysis or as static analysis of the source code of the software application.

A software composition accounting program (SCAP) 250 (See FIG. 2C) can be employed to identify software application dependencies upon package manager supplied software components, which are dependencies that are expected to be software application incorporated and package manager supplied software components. The SCAP 250 can be employed to identify abnormal dependencies of a software application upon software components, which are software application incorporated and non-package manager supplied software components, and further employed to identify potentially phantom dependencies among the abnormal dependencies, which are unexpected dependencies upon outside software components.

The SCAP 250 is designed to perform a search for software components for which a software application potentially depends upon. A relationship between the software application and each of these components constitutes a potential dependency, regardless of whether or not such a dependency is an actual dependency and regardless of whether such an actual dependency is classified as being normal or abnormal. Each of these components is referred to herein as being a target component. Such target components are typically source code related, and either including source code or constructed from source code, and such source code is also referred to herein as target source code.

In some circumstances, an instance of target source code, if found, may not include other related information, referred to herein as supplemental information, that identifies various associated circumstances and/or characteristics surrounding this particular instance of target source code.

In this circumstance, a source code search engine, also referred to herein as a global source code search engine, can be employed to perform an Internet wide (global) search for instances of source code, residing outside of the software application, that are matching or that are sufficiently similar to that of an instance of target source code, via employment of a semantic hash algorithm.

Such a global search for source code residing outside of the software application, can be for the purpose of obtaining supplemental information regarding the target source code. The supplemental information can include origin identification, to identify an author and/or an organization that originally developed the target code. The supplemental information can also include version and/or version history information, and/or a version and/or variations of version of the target source code. The supplemental information may uncover comments and reviews regarding the target source code.

This brief description of the invention is intended only to provide a brief overview of subject matter disclosed herein. This brief description is not intended to identify key features or essential features of the claimed subject matter, nor is it intended to be used as an aid in determining the scope of the claimed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. The drawings are not necessarily to scale, and the emphasis generally being placed upon illustrating the features of certain embodiments of the invention. In the drawings, like numerals are used to indicate like parts throughout the various views. For further understanding of the invention, reference can be made to the following detailed description, read in connection with the drawings in which.

DETAILED DESCRIPTION OF THE INVENTION

Figure 1A:
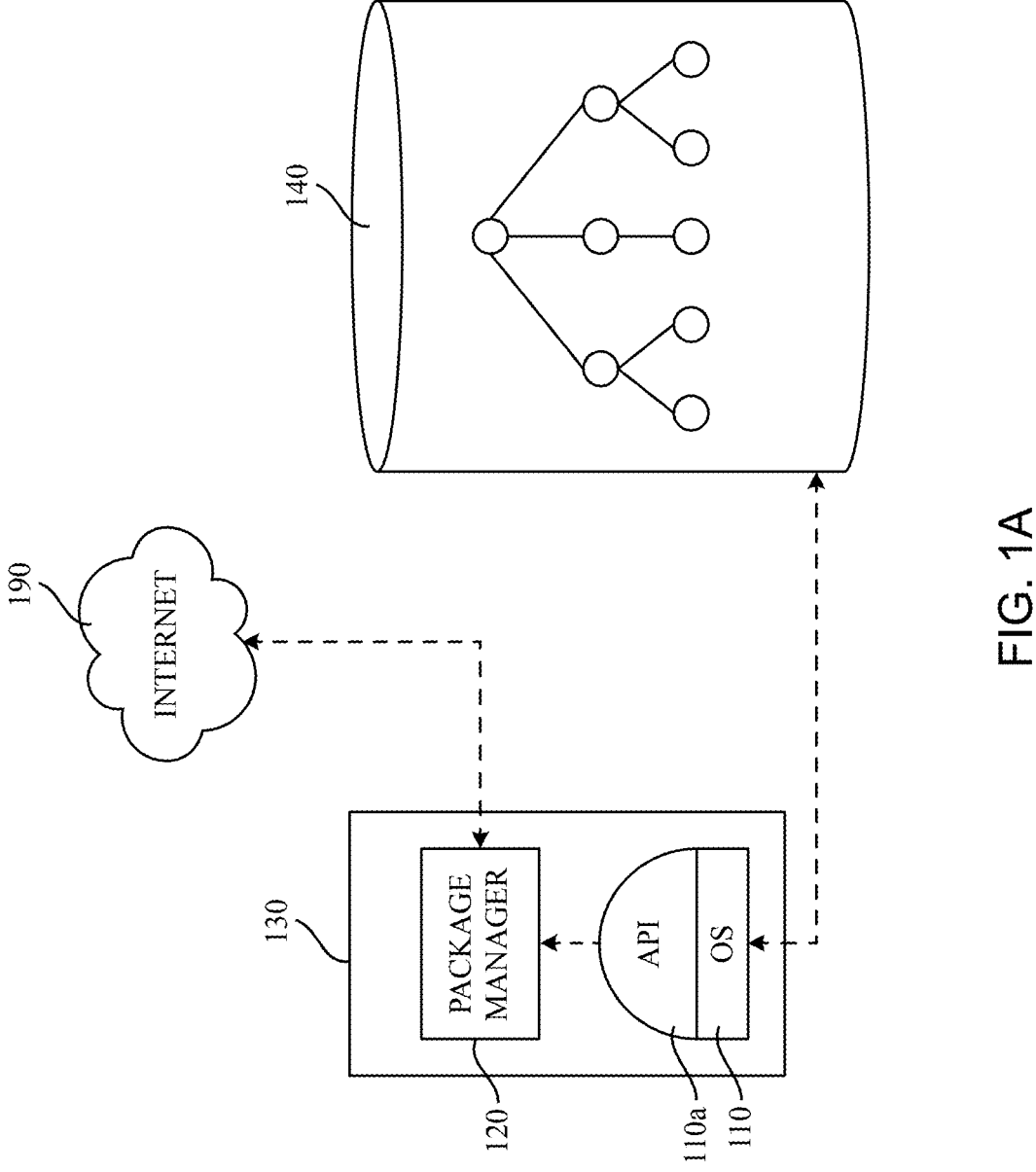
FIGS. 1A-1B are simplified block diagrams illustrating operation of a package manager within a computer system, and a simplified representation of hardware and software residing within the computer system.

FIG. 1A is a simplified block diagram illustrating operation of a package manager 120. As shown, the package manager 120 interoperates with an operating system 110, via an application programming interface (API) 110a provided by that operating system 110.

A developer of a software application, also referred to herein as a software developer, typically being an organization, can acquire and incorporate software developed by entities that are outside of the organization of the software developer. This type of software is referred to herein as outside developed and/or supplied software or as third-party software. This type of software can be of a type that is also referred to as open software or open-source software, meaning a classification of software that can be incorporated into a software application at little or no cost by the software developer, providing that the software developer complies with any license requirements or other conditions that are associated with acquiring the third-party software.

The package manager 120 is designed to access and install one or more software packages, where each software package includes a collection of files. Some of these files include source code, which are referred to as source code files, and some of these files can include binary executable machine code, which are referred to herein as object files, or these files can include other types of information, including human readable information (data) or non-human readable information (data). Such files can also include data, which may or may not be human readable. Files including non-human readable information are referred to herein as binary files, or as binary artifacts.

The package manager described above works in parallel, and without any actual communication with a compiler or run-time system that further processes the software components within the software packages that are installed by the package manager. A software developer, being the acquirer of the package software, typically specifies within a manifest file, specific rules regarding what software packages and components to install and how to install those packages and components within a workspace of the software developer. These rules are also referred to as "constraints". The package manager uses the manifest file as input to determine which third ($3^{rd}$) party packages to download.

The package manager, by itself does not know what specific software components are actually required for the software application to be developed and/or deployed. As a result of this type of circumstance, the inventory of software packages and their software components can include various types of unwanted discrepancies. These discrepancies can cause unwanted characteristics of the application software being developed and/or deployed, where the application software includes software installed by the package manager.

For example, such discrepancies can result from a package manager manifest including package references (dependencies) that are not required by the application software that is to be developed and/or deployed. Or, on the other hand, the package manager manifest might be lacking references (dependencies) that are required by the application software that is to be developed and/or deployed.

The package manager manifest can characterize references (dependencies) as being "test" or "dev", meaning that these references (dependencies) are required for the testing phase ("test"), or for the development phase ("dev"), of the application software, but not for the runtime phase, of the application software that is to be developed and/or deployed. Consequently, the application software as developed, is including and/or using dependencies that it should not be including or using during its runtime phase.

In order to satisfy the constraints of a package manager manifest, the package manager might install additional dependencies that are not defined within the manifest, and that are also incorporated within and possibly used (depended upon) by the software being developed, and without the software developer (programmer) knowing about the presence and use of such dependencies within the application software, and despite such dependencies not being defined within the package manager manifest.

In other instances (circumstances) the software application might require other packages that are brought into the system through additional methods outside the use of the package manager and these dependencies are used by the software application without having a declaration in the package manager. This means that the software application is using dependencies that are not declared by the package manager.

In the above-described circumstances, such discrepancies create a false representation of the actual dependencies that are required by the application software being developed and/or deployed.

Referring back to the source code files, the source code may or not be classified as open-source software. Typically, each of these software packages can be accessed, via a public network, such as via the Internet network 190. A copy of each software package is installed onto non-volatile media 140 that is typically directly (locally) accessible to the computer system 130, and within which the operating system 120 software and the package manager 120 software are executing.

The non-volatile 140 media is typically configured to store one or more file systems. Typically, within a file system, the package manager 120 is assigned to a location, also referred to herein as a package manager operating location or as an operating location of the package manager, within this file system. This operating location can be a particular folder within a Microsoft Windows file system, or else is a particular directory within a UNIX file system, just for example.

The package manager 120 is typically designed to create and control the content of files, such as administrative files that track actions of the package manager 120, at file system locations that are typically at or below this operating location of the package manager 120. Such files and file system locations are referred to herein as being within a scope of operation of the package manager 120. The scope of the operation of a particular package manager is also said to be within a region (portion) of the file system occupied by the particular package manager.

For example, one or more software packages are typically installed by the package manger 120 at or below this operating location of the package manager 120. Such an operating location is also referred to herein as being delimited (bounded) by a root folder or as a root directory of the region of operation of a package manager.

Files that are created as a result of the installation activity of the package manager 120, such as computer programming source code (human readable) files or binary object (non-human readable) files, also referred to herein as artifacts, residing within software packages installed by the package manager 120, are typically stored in one or more files at or below this operating location (root directory or root folder of the region of operation of a package manager), and within the region (portion) of a file system that is within the scope of operation, and occupied by the package manager 120.

Such binary (non-human readable) files may or may not include machine code instructions, also referred to herein as machine code, which represents instructions for a central processing unit (CPU) of the computer system 130, upon which the software executing within the computer system 130, executes. Such binary files may include data, being other than machine code.

For example, npm (NPM) is a package manager that is employed for use with packages including the JavaScript computer programming language source code. The npm package manager creates a "node modules" folder, within which files, including source code files, for a project are installed. Alternatively, Maven is a package manager that is employed for use with packages including the Java computer programming language source code, where Java is a computer programming language that is substantially different than JavaScript. However, Maven can also be configured to support source code for the C#(also referred to as "C Sharp") and the Ruby computer programming languages.

Figure 1B:
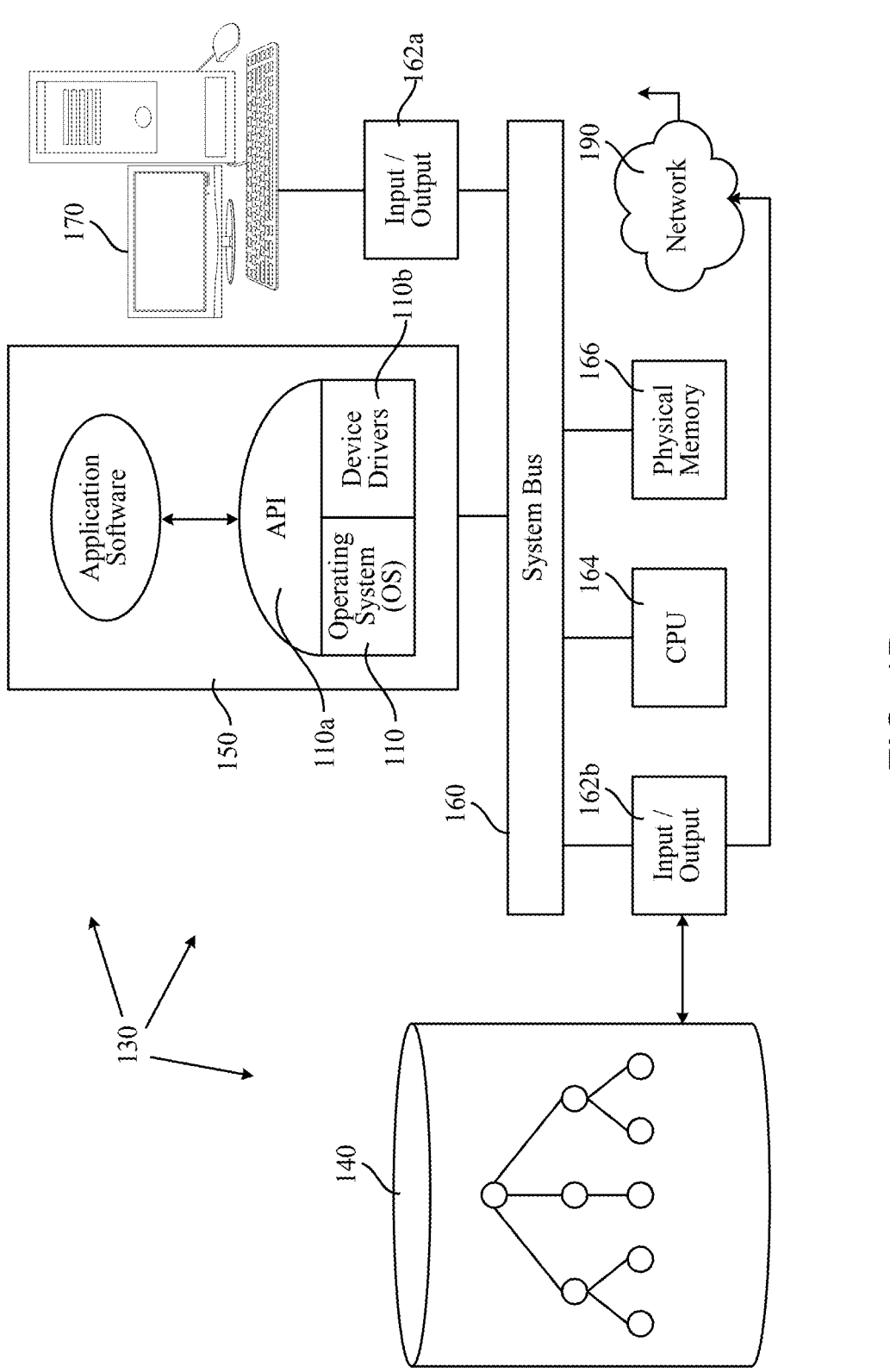

FIG. 1B is a simplified block diagram representation of hardware and software residing within the computer system 130. As shown, the computer system 130 includes at least one system bus 160 which is electronically connected to a central processing unit (CPU) 164 and physical (fast) access memory 166. Physical memory 166 can include such as random-access memory (RAM) and/or flash memory, which can be employed to provide a virtual address space (virtual memory) 150 for storage of CPU interfacing software executing upon the computer system 130. Software executing on the computer system includes application software 180 and operating system software 110. The application software typically includes a variety of processes that interoperate with the operating system via an applications programming interface 110a. The operating system software including the application programming interface (API), and including and a plurality of device drivers 110b.

Device interface (Input/Output) hardware 162a-162b is also electronically connected to the system bus 160 and is employed to interface with various types of device hardware. Such device hardware being configured for performing transfer (input and output) of data between devices that interoperate within the computer system 130. Such devices that interoperate within the computer system 130, include a collection of user interface hardware 170, including a separate computer, keyboard and user interface display screen, and such devices further including network communications hardware (not shown), and non-volatile mass data storage hardware 140.

The mass storage hardware (device) 140, can be a solid-state disc or other type non-volatile data storage device. The user interface hardware, such as collectively a liquid crystal display (LCD) screen with mouse and a keyboard, are among the devices that are physically connected to the computer system 130. Also note that network interface hardware is employed for electronic connection to a communications network, including such as the Internet network 190.

Figure 2A:
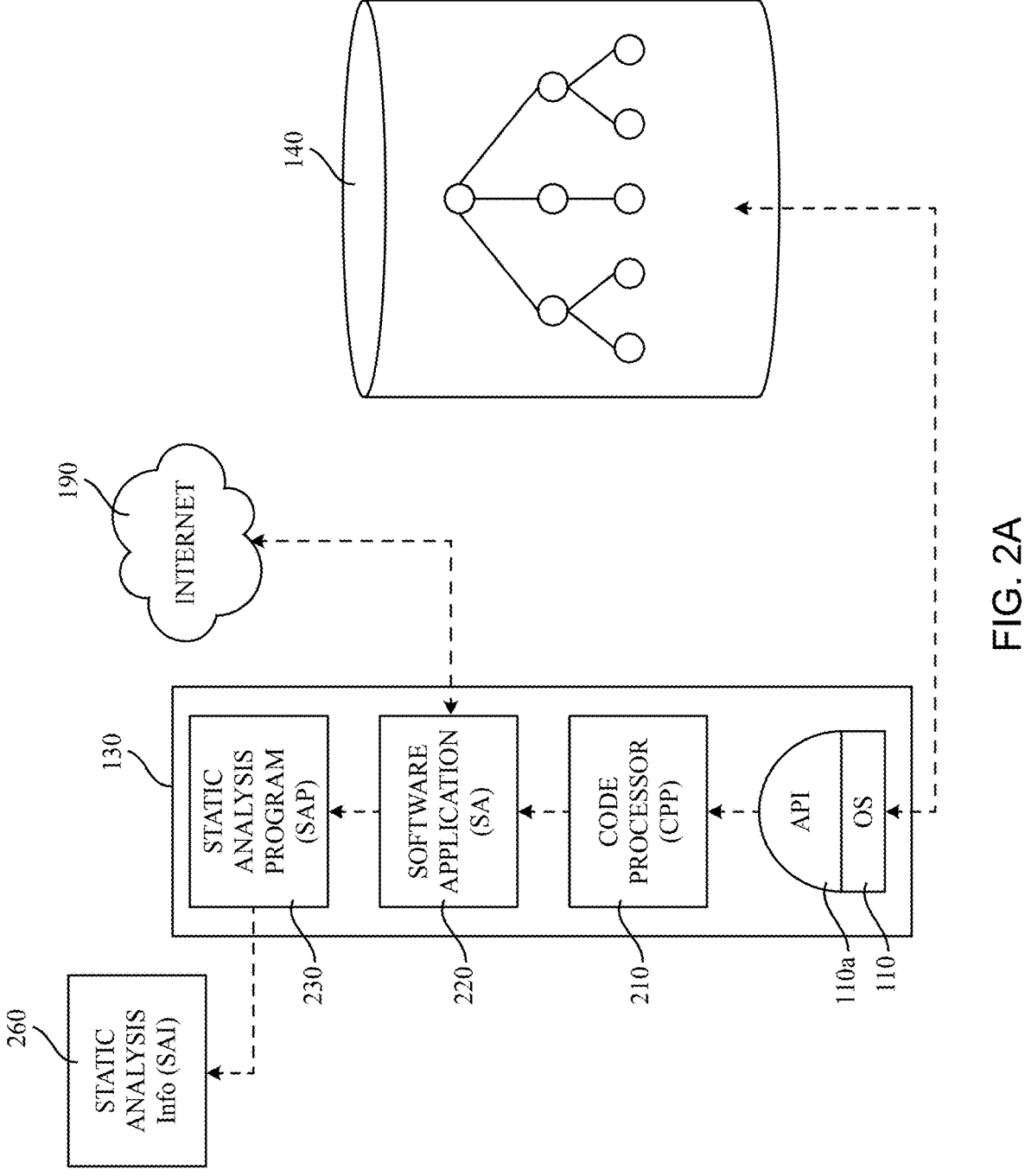
FIGS. 2A-2C are each simplified block diagrams illustrating operation of a code processor program (CPP) and a static analysis program (SAP), a software application build procedure (SABP), and a software composition accounting program (SCAP), in relation to a software application.
Figure 2B:
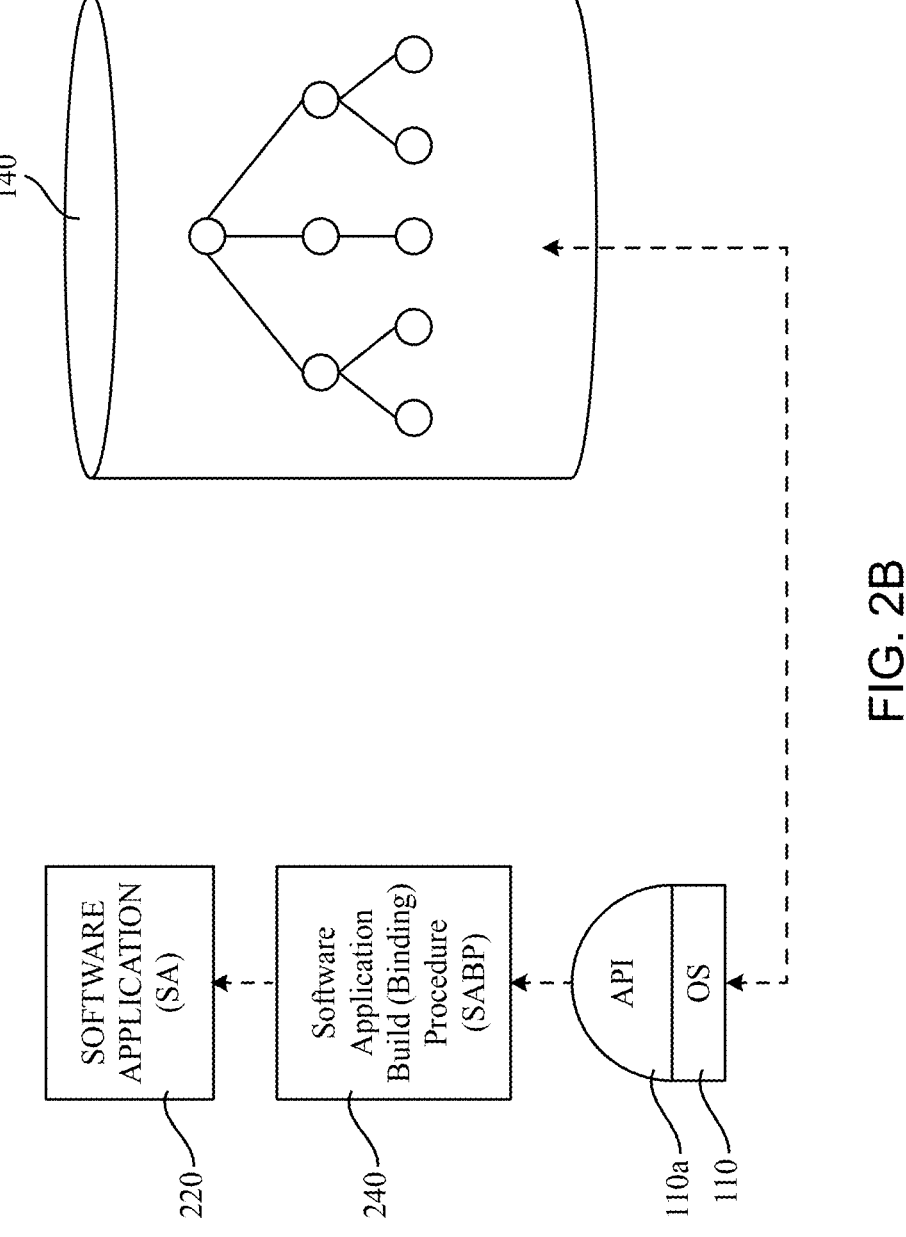
Figure 2C:
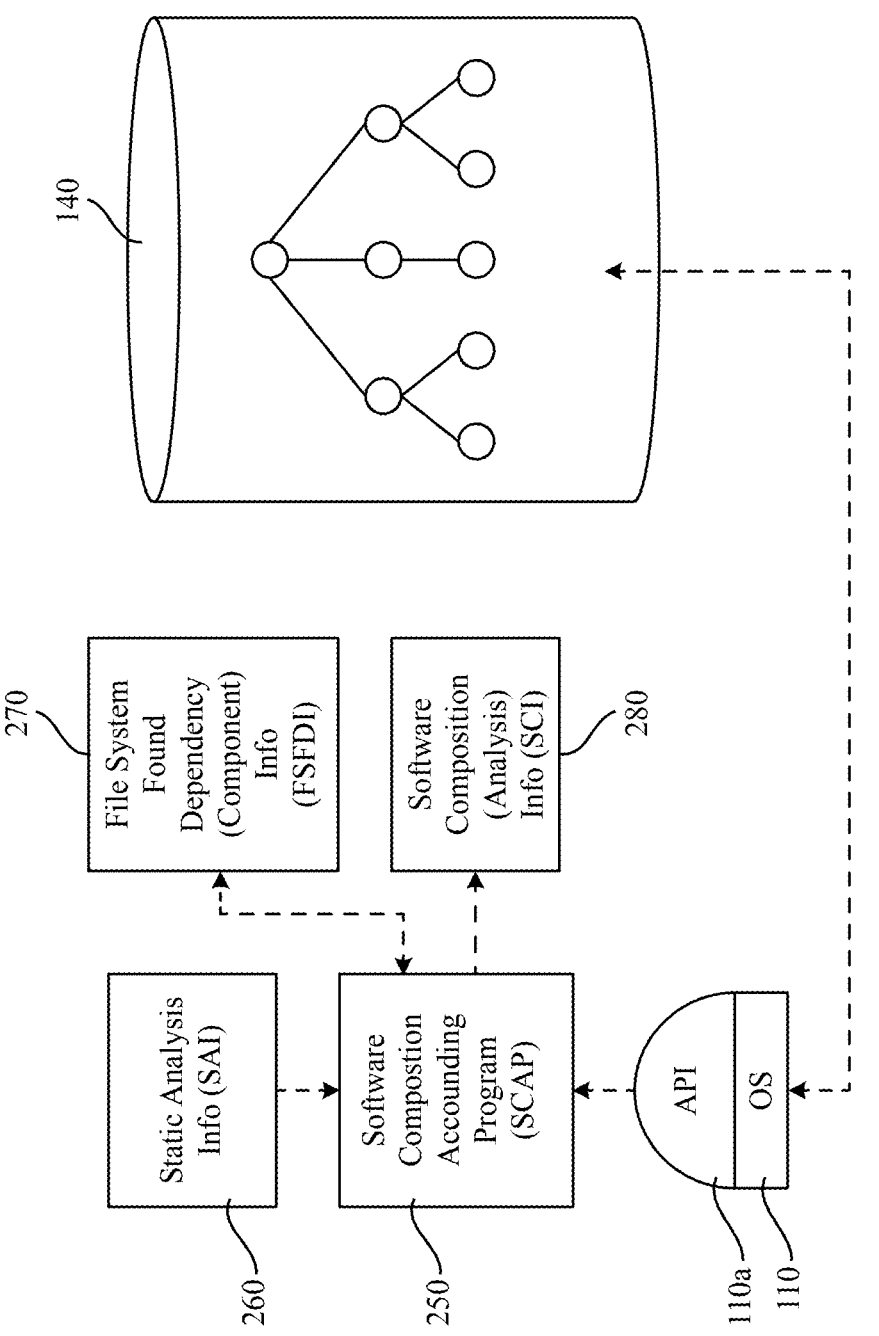

FIGS. 2A-2C are each simplified block diagrams illustrating operation of a code processor program (CPP) 210 and a static analysis program (SAP) 230, a software application build/binding procedure (SABP) 240, and a software composition accounting program (SCAP) 250 in relation to a software application.

FIG. 2A is a simplified block diagram illustrating operation of a software code processing program (CPP) 210, also referred to herein as a code processor 210, in relation to that of a software application (SA) 220 and a static analysis program (SAP) 230.

As defined herein, the code processor 210, also referred to herein as a code processing program 210, is software that is designed to input and read computer programming language source code and/or compiled source code (binary code), and further designed to perform actions in accordance with program statements, such as (directives/commands/instructions) within the computer programming language source code and/or binary code, being input by the code processing program 210. Such source code and binary code being packaged into files. Files including binary code, also referred to herein as binary artifact files, including such binary code, which is also referred to herein as compiled source code, binary object code, binary machine code, virtual machine code, machine code instructions or as machine code.

For example, a JavaScript computer programming language interpreter program, is a code processor 210. Likewise, a C++ computer programming language compiler program is also a code processor 210, just for example. A binary object code linker is also another type of code processor that provides for the input of binary files, such as binary object code files which are output from compiled source code, into the construction of a software application (SA), which is also referred to herein as a software application program or as a program. A set of binary object code files can be incorporated into one file, which is also referred to herein as a binary library file, a binary library or as a library file.

The code processor 210 inputs and reads source code files that are stored within a file system and that are accessible to the code processor 210, such as the file system where package manager installed software components, such as source code files, are stored (reside). However, the code processor 210 is not restricted to only reading package manager installed source code files, and may input and read other source code files that are located outside of the scope operation of (being a region of a file system occupied by) the package manager 120, and/or the code processor 210 can input and read files from another file system that is other than the file system, within which the scope of operation of the package manager 120 resides.

For example, if the code processor 210 is a C++ computer programming language compiler that is executing on a UNIX operating system, operation of this compiler is typically directed by a software application build/binding procedure (SABP) 240 (See FIG. 2B). This SABP 240 could invoke a UNIX make utility program. The make utility program is designed to direct the C++ compiler to access and read source code files at various file system locations, and possibly from one or more file systems, where such file system locations are separate and distinct from, and possibly other than any file system locations that reside within the scope of the operation of a package manager 120, that would be expected to supply such source code to the C++ compiler.

Alternatively, the code processor 210 could instead be an interpreter type of computer program, such as for interpreting the Java Script programming language, as opposed to a compiler type of computer program, such as for compiling the C++ programming language, for example.

An interpreter (type of) computer program interprets the source code of a software application (performs actions in response to the source code) during the runtime execution of that software application. A compiler (type of) computer program compiles the source code of a software application (generates binary machine code) prior to the runtime (execution) of that software application.

An interpreter (type of) computer program is designed to perform at least some binding (symbolic resolution) of the structure software application during the runtime of that software application, while a compiler type of computer program is typically designed to perform binding (symbolic resolution) of the structure of a computer program prior to the runtime of that software application. Symbolic resolution involves assignment of virtual addresses to names (symbols) within the source code of a software application. Accordingly, a compiler program is said to perform "early binding" of a software application, while an interpreter program is said to perform "late binding" of a software application.

The code processor 210 is designed to access and read source code files, and to accomplish such access, it is designed to know of the file system locations of the source code files that it accesses and reads. Such file system locations are each referred to as being locations specified within a search path. The code processor can be directed via a configurable (configuration) parameter, to search a sequence of locations along such one or more file system search paths, also referred to herein as search paths.

These search paths include locations in one or more file systems at which dependencies software components of a software application are located. In some embodiments of the invention, the code processor 210 records and stores into a log file the file names and file paths, being the file system locations, of source code files (dependencies) that are accessible and read and optionally processed in whole or in part, by the code processor 210.

Note that the code processor 210 may access and read a particular source code file, and elect not to process (compile or interpret) the source code content of that source code file, in whole or in part, because that source code file fails to include content, in whole or in part, that is required to build (bind) the software application 220 being constructed by the code processor 210.

For example, if the code processor 210 is searching for a function that is named and defined as "April ( )", being a function that has no parameter arguments as indicated by the "( )", then a source code file named April when accessed and read, may lack a function having the same function name and function definition for function that is named and defined as April ( ). However, that same file named April might include a function definition of another function named April (int X), which instead has one parameter argument that is an integer named "X".

This function that is named and defined as April (int X), is a function having a different function definition than that of the function being searched for and that is named and defined as April ( ). This April (int X) function is not exactly what the code processor 210 is searching for to read (input) and process (bind into the software application), and the code processor 210 will instead access and read, but NOT process (bind) this source code file that includes the function April (int X), and that excludes the function April ( ), and as a result, this source code file lacks one or more associated characteristics of what it (the code processor 210) is searching for, in order to construct (bind together) an entire software application 220 that is designed to include the code (software) of the April ( ) function. By not processing (binding) the content of this source code file, the code processor 210 is not incorporating (not binding the software corresponding to) the source code that is stored within this source code file, into the software application 220 being constructed.

However, if the code processor 210 is also searching for a function defined as May (int X), and that same function May (int X) is defined within the same source code file named April, then the code processor 210 will access, read (input) and process a portion of the file named April, that includes the function defined as May (int X), but will not process the portion of that file that includes the function defined as April (int X). This is true because the May (int X) function source code satisfies the one or more characteristics of which the code processor 210 is searching for. Hence, this source code file constitutes a dependency of the software application 220 that is being constructed via the code processor 210, that is searching for the function May (int X).

Upon construction (building/binding) of the software application 220, the software application 220 can be exercised (run) during a period of time that is referred to as a "runtime", to perform actions that are directed from the source code (software) of the software application 220, where such source code has been accessed, read and processed by the code processor 210. Note that while being exercised during runtime, the software application 220 may perform actions involving the Internet 190.

A static analysis program (SAP) 230 is a program that is designed for inputting, processing and/or analyzing software (source code) that is included within a target software application (computer program) 220. Such software (source code) is input into a code processor 210 to construct (build/bind) that target software application (220). Such software (source code) is also referred to herein as embodying the (target) software application 220. Such analyzing that is performed by the static analysis program (SAP) 230, is designed to be performed separate from and not during, any interpretation or execution (runtime) of the target software application 220 being analyzed.

In accordance with the invention, the source code static analysis program (SAP) 230 is further designed to identify statements (commands/directives) within the source code of a target software application being analyzed, where such statements are indicative of at least one dependency between the software application 220 being analyzed and one or more outside (third party) software components that are intended to be incorporated into the software application 220 being analyzed. Such statements (commands/directives) are also referred to herein as dependency statements, dependency commands and/or dependency directives.

Such outside (third party) software components typically reside separately from an inhouse developed (native) portion of the source code of the target software application 220. Such one or more outside (third party) software components that the software application 220 depends upon, could be supplied by a package manager. Such outside (third party) software components are also referred to herein as being package manager supplied or as package manager associated components, or as package supplied or as package associated components.

As referred to herein, "third-party" software components can also refer to software components that are supplied to a software application 220 in packaged form from a source that is not necessarily a "third-party", relative to an inhouse developer or developing organization of a particular software application.

For example, an inhouse software developer may decide to package software for inclusion into multiple software applications, and at least one of these multiple software applications is currently under development by the same inhouse software developer. Hence, the software developer is packaging this software as a package for incorporation into his own software application under construction, as if this packaged software was developed outside of his organization, but at the same time, the same software is packaged in the same manner for incorporation into other outside software applications that are not being developed inhouse by the software developer.

The results of static analysis program (SAP) 230 are output into a static analysis information (SAI) file 260, which is also referred to as a static analysis data file 260. This file 260 encodes the results of the performance of the static analysis procedure as data. Such data identifies dependencies within the target software application 220 upon one or more outside (third party) software components. Such static analysis information (SAI) file (data) 260 can be further processed by other software tools, such as by the software composition accounting program (SCAP) 250 (See FIG. 2C), to search for such outside (third party) software components that are depended upon by the target software application 220, and that are expected to be incorporated into the software application 220, via the actions of a software application build/binding procedure (SABP) 240.

A package associated component is delivered (supplied) and installed by a package manager program. The package manager program is said to be associated with a delivered package that includes the package associated component. Note however, that in some circumstances, a software component may not be incorporated into the software application 220, via a software application build/binding procedure (SABP) 240, despite that such a software component was delivered (supplied) to the non-volatile storage 140 of the computer system 130 by a package manager 120, that is associated with the package delivered software component.

FIG. 2B is a simplified block diagram illustrating operation of a software application build/binding procedure (SABP) 240, in relation to that of a software application 220, including that of a target software application 220. A software application build/building procedure (SABP) 240, is a type of software application (including one or more computer programs) that is designed for building (constructing) another software application 220, referred to as a target software application 220, the source code of which can be analyzed by other software tools, including such as that of a static analyzer.

For example, within a UNIX operating system environment, an SABP 240 can be implemented as a UNIX shell script program that is designed to invoke a UNIX make utility program that invokes a set of one or more code processors 210 for processing source code and optionally, other binary object code, in order to construct a software application 220. Said another way, the source code and the binary object code that are processed by the code processor(s) 210 are said to define the structure and operation of, and are said to define the target software application 220.

Or alternatively, this UNIX shell script program can be designed to invoke a set of one or more code processors 210 directly, to construct a software application 220, without the assistance of the UNIX make utility program. However, there are numerous advantages to employing a UNIX make utility program, and employment of such a software tool, that functions like the UNIX make utility program, in preferred.

Typically, this software application build/binding procedure (SABP) 240 can be designed to access and compile a large plurality of files including source code files that embody the software application 220, for computer programming languages that are compiled. Such compiled languages employ early binding. Other computer programming languages are interpreted and are referred to as employing late binding. This procedure can be designed to search for files including source code via a configurable (file system) search path. This search path can be configured (defined) to pass through and search each of a plurality of locations (directories/folders) within each of a plurality of file systems that reside within the non-volatile media 140 of the computer system 130. Such locations include a plurality of directories (folders) within the plurality of file systems that reside within non-volatile media 140.

This file system search path, also referred to herein as a build (binding) procedure search path, defines a sequence of locations within one or more file systems for which to search for and to access (input) and process the content of files including source code or object code that collectively embody the software application 220. Also, the SABP 240 is typically designed to access source code files and/or access and link together binary object code files to construct executable files that are each designed to execute within one or more processes within a computing environment that is controlled by an operating system. These types of files are referred to herein as executable files that are targeted to execute and interoperate with that operating system 110. In some circumstances, the build procedure search path can range beyond locations on the non-volatile data storage 140, and extend over a network to access other non-volatile data located outside of the computer system 130.

Ideally, upon completion of this software application build/binding procedure (SABP) 240, a software application 220 is entirely constructed. However, in some circumstances, the SABP 240 can fail to entirely construct the software application 220 due to errors caused from within one or more source code files, and/or due to errors in the build procedure itself 240. In such circumstances, the build/binding procedure 240 itself and/or the content of one or more source code files are typically modified in pursuit of a successful execution of the SABP 240, in order to successfully complete and entirely construct the software application 220 without error.

FIG. 2C is a simplified block diagram illustrating operation of a software (source code) composition accounting program (SCAP) 250 in relation to that of a software application 220. A software composition accounting program (SCAP) 250 is a software application (software tool) that is designed for searching for one or more software components that that are depended upon for the construction and/or execution of a target software application 220.

In some embodiments, the software composition accounting program (SCAP) 250 inputs and reads information from a file, referred to herein as static analysis information (SAI) 260 file, which stores such information as data. Included within this file, there is software application dependency information regarding any target software application dependencies upon software components to be incorporated within the target software application 220. The static analysis program (SAP) 230 identifies and stores such software application (component) dependency information (SADI) to this SAI file 260.

In some embodiments, each (component) dependency is represented by a binary encoded object that is serialized and stored within the SAI file 260. In other embodiments, each dependency is stored as a human readable record within the SAI file 260. In some embodiments, the binary encoded objects can be translated into the human readable records. The SAP 230 identifies each software component dependency by information associated with a directive that is found within the source code, where each dependency is referencing one or more components that are depended upon by the target software application 220.

The SCAP 250 is designed to perform a search, being a search in accordance with a search path of the software application build/binding procedure (SABP) 240, the search being for finding (identifying) any one or more software components that appear to satisfy (match) at least one component dependency from within the target software application.

Typically, when a software application build/binding procedure (SABP) 240 finds (identifies) a software component that satisfies (matches) a (software) component dependency from within a target software application 220 under construction, it 240 incorporates that software component into a software application 220 under construction, that is being built/bound together, and from that point in time onwards the SABP 240 will stop (cease) to search for a software component that matches that same component dependency, for the remainder of the time period of construction, because the work required to satisfy that same specific (software) component dependency has been completed.

In other words, upon satisfaction of a particular (component) dependency by the SABP 240 during construction of a software application 220, that component dependency is effectively removed from a list of non-completed work of the SABP 240, and effectively forgotten by the SABP 240 going forward in time during the remainder of the construction of the software application 220.

The software component satisfying a component dependency from within the software application 220, being incorporated into software application 220, may itself, include one or more other (component) dependencies. The SABP 240 will recognize and add these one or more other component dependencies to its list of uncompleted work for the SABP 240 to continue to construct (build/bind together) the software application 220, and then work (endeavor) to satisfy these newly added one or more component dependencies, via continued searching for and identifying one or more software components that satisfy these newly added one or more other (component) dependencies.

Preferably, and unlike the SABP 240, the SCAP 250 is designed so that upon finding a software component that matches a component dependency of a software application 220 being constructed, the SCAP 250 does not remove that component dependency from its list of non-completed work for the SCAP 250. This design feature enables the SCAP 250 to detect and find multiple software components, if they should exist, that reside along the search path of the SCAP 250, and that satisfy at least one same component dependency of the software application 220 constructed by the SABP 240.

This particular search path is referred to herein as the search path of the software composition accounting program (SCAP) 250, or as the software composition accounting program (SCAP) search path, or as a SCAP search path. Multiple components that satisfy (match) one same component dependency within a software application are also each referred to herein as duplicate or redundant software components, or matching instances of software components, that each satisfy (match) that one same articular (component dependency) within the software application 220.

For example, this SCAP search can find and locate software components residing within an installed software package, that satisfy software application dependency information (SADI) generated by the static analysis program (SAP) 230, and that is stored within the static analysis information (SAI) file 260. The SADI and SAI data resulting from performing static analysis of the target software application 220.

Figure 3A:
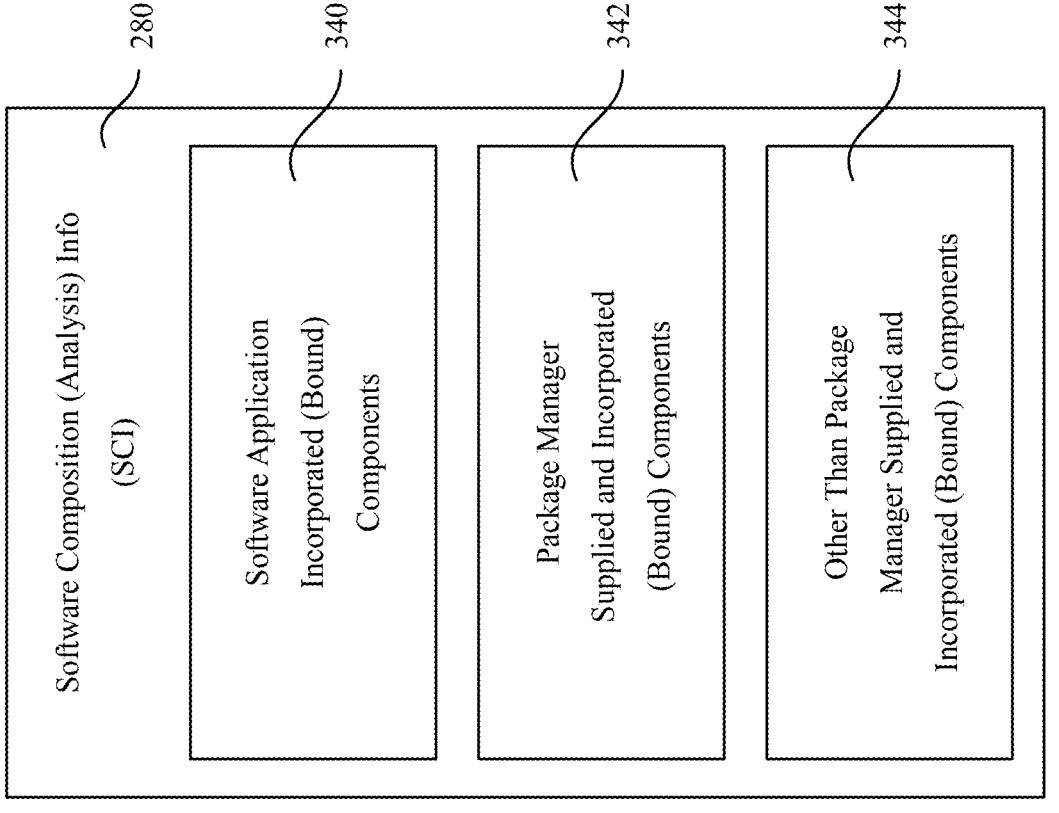
FIGS. 3A-3C illustrate information resulting from software composition analysis, including software application incorporated dependencies that can be identified from software composition analysis.
Figure 3B:
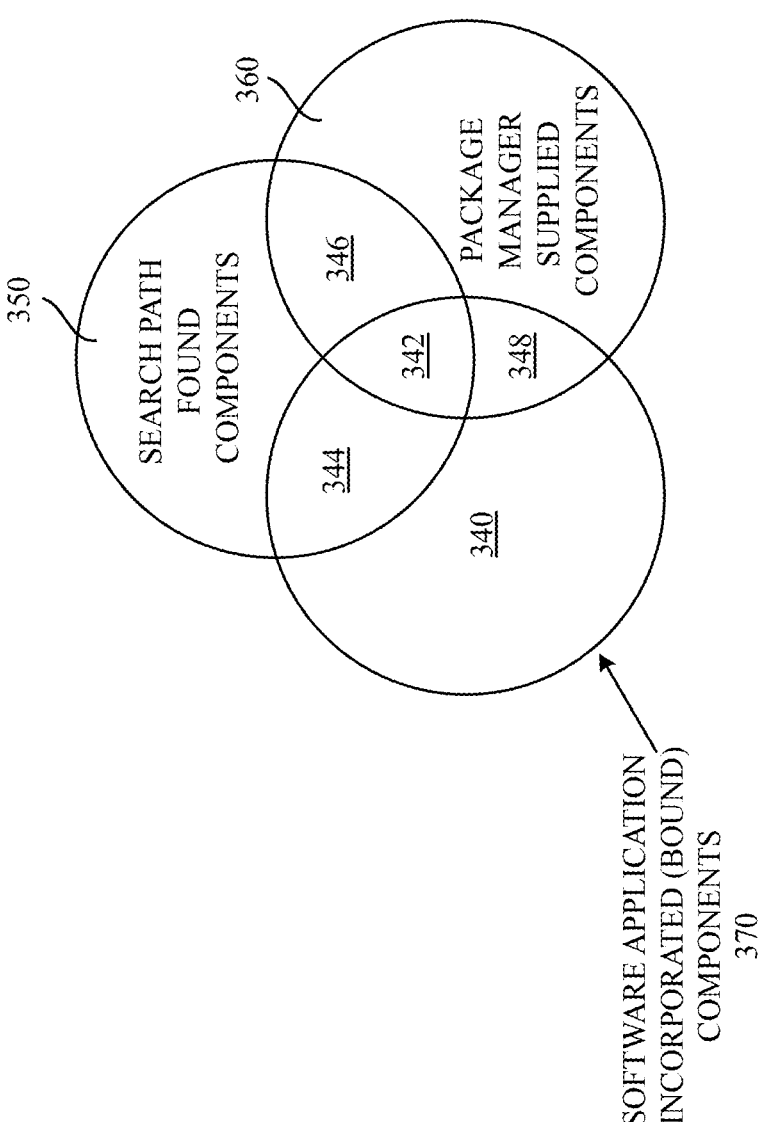
Figure 3C:
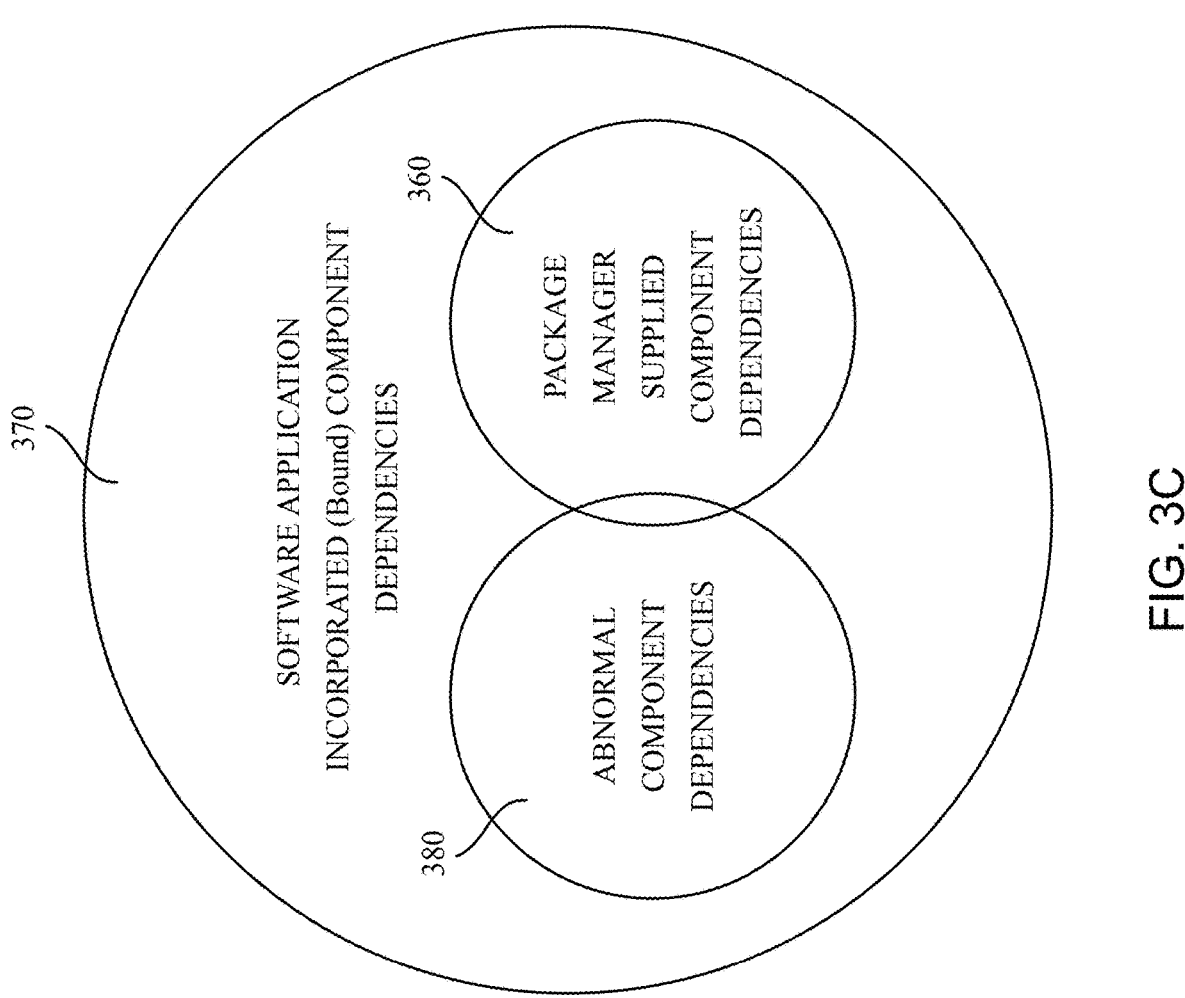

FIGS. 3A-3C are simplified block diagrams illustrating some of the results of software composition analysis, performed by a software composition accounting program (SCAP) 250, and illustrate software application incorporated dependency categories, that are associated with software application incorporated components, and that can be identified via the software composition accounting program (SCAP) 250.

FIG. 3A is a simplified block diagram illustrating software composition (analysis) information (SCI) 280, being at least some of the information resulting from software composition analysis (SCA).

Software composition analysis involves accounting for components, whether software of data components, that are intended to be incorporated into a target software application

220. A software component can be an instance of source code expressed in a particular computer programming language, or an instance of executable data, such as machine code. A data component represents data, typically represented as a set of binary encoded data, for example.

A software component that is employed to construct a software application, and that is incorporated into the software application, is typically stored within a file, and is also referred to herein as residing within a file. Some files can include multiple software components. Source code files, being files that include computer programming language source code, include source code that is human readable and that is expressed in accordance with a particular computer programming language.

Such source code is typically expressed in the form of human readable data, that is encoded in accordance with the American Character Encoding Standard (ASCII). The ASCII standard is designed to encode letters, numbers and symbols that are employed to represent computer programming language source code in a human readable form.

Binary files, being files that include information that is expressed as an arrangement of binary values, such information also referred to herein as binary data, such binary values are typically, but not always, not encoded in accordance with the ASCII standard. Binary encoded data is typically not human readable, without use of some sort of translation tool that represents the binary encoded data in a more human readable form.

A software application is typically constructed in part from components that are supplied by a package manager. A package manager can be employed to supply and install one or more software packages. A software package is also referred herein as a package. A package typically includes a plurality of files, also referred to herein as a plurality of artifacts, collectively including a plurality of components, and can include a plurality of types of components, also referred to herein as component types.

Software components, being in the form of source code or data, that are incorporated into a target software application are referred to herein as software application incorporated (bound) components 370. Software components that are supplied from a package manager, whether or not those components are incorporated into the software application, are referred to herein as package manager supplied components 360 (See FIG. 3C). Package manager supplied components that are incorporated (bound) into a software application are referred to herein as package manager supplied and incorporated components 342 and 348, as shown in FIG. 3C.

Components that are not supplied from a package manager are referred to herein as non-package manager supplied components, and are also referred to as being other than package manager supplied components. Such non-package manager supplied components that are incorporated into the software application (SA) are referred to as other than package manager supplied and incorporated components 344. Components that are incorporated into a software application, whether package manager supplied or not, are referred to herein as software application incorporated (bound) components 370.

FIG. 3B is a Venn diagram illustrating various classifications (categories) of components, with respect to whether each of these components are SCAP search path found components 350, and/or package manager supplied components 360 and/or software application incorporated (bound) components 370. Notice that the intersection between the three above categories 350, 360 and 370 represents SCAP search path found, package manager supplied and software application bound components 342, This category (classification) 342 which is an intersection of other categories 350, 360 and 370 is also referred to herein as package manager supplied, found and bound components 342.

The intersection between SCAP search path found components 350 and software application incorporated (bound) components 370, excluding package manager supplied components 360, represents components 344 that are not supplied by a package manager 120, and that are found and bound (incorporated) into the software application 220.

Components that are neither SCAP search path found 350, nor package manager supplied 360, but that are incorporated (bound) into the software application, also referred to as bound, not found and not package manager supplied components 340. In most circumstances, this category is likely to be empty, and unlikely to include components, unless perhaps, in circumstances where the SCAP search path is incorrect and does not match that of the build search path of the software application build procedure.

Components that are not SCAP search path found, and package manager supplied, and that are incorporated (bound) into the software application, are referred herein as being bound, not found but somehow being package manager supplied components 348. In most circumstances, this category is likely to be empty, and unlikely to include components, unless perhaps, in circumstances where the SCAP search path is incorrect and does not match that of the build search path of the software application build procedure.

As shown, at least some of the software application incorporated component (bound) dependencies 370 are package manager supplied 342 and 348, and alternatively, at least some of the software application incorporated component (bound) dependencies are not package manager supplied 340 and 344.

FIG. 3C is a Venn diagram illustrating a relationship between software application incorporated component dependencies that are package manager supplied 360 and application incorporated component dependencies that are considered abnormal 380. As classified herein, such third-party software component dependencies that are supplied by a package manager are generally classified as being "normal". Alternatively, third-party software component dependencies that do not appear to be supplied by a package manager are generally classified as being "abnormal". Such abnormal dependencies may or may not be known to, and may be unknown to, one or more personnel that are responsible for developing and/or deploying the target software application 220.

In some circumstances, an abnormality may be detected in association with a package manager supplied component. For example, a copy of a package manager supplied component may be modified in some way and stored within the same region (portion) of a file system that is within the scope of operation of a package manager 120, that supplied an un-modified version of that software component.

Preferably, the software composition accounting program (SCAP) 250 is designed to detect the presence of multiple software components, that it 250 finds along the SCAP search path, and where each of these found multiple software components satisfies a same one software component dependency within a target software application 220, under construction.

In this circumstance, the software composition accounting program (SCAP) 250 is designed to detect multiple software components within the region (scope of operation) of a package manager, that each satisfy the same one software component dependency that was identified by the static analysis program (SAP) 230.

Given that there are multiple software components that can each satisfy the SAP identified software component dependency, this creates ambiguity that should be identified and brought to the attention of the personnel of the software developer. Such an ambiguity may or may not be known to such personnel. This ambiguity constitutes a software component dependency that is classified as "abnormal", even though this software component dependency appears to be supplied by a package manager.

In other circumstances, a package manager supplied component may be copied to a location that is along the build and SCAP search paths, but outside of the scope of operation of a package manager. As a result, the component appears to not be package manager supplied, but is in fact, package manager supplied. This circumstance is also classified as being "abnormal".

Regardless of the circumstances, an abnormal dependency may or may not be known to, and may be hidden from one or more personnel that are responsible for developing and/or deploying the target software application 220.

Some of the software application incorporated dependencies 370 are further classified as phantom dependencies, which are classified as abnormal dependencies that are further, also unknown to one or more personnel of the organization that is responsible for deploying and/or developing the target software application 220. It is in the best interest of the members of an organization to discover phantom dependencies, because such phantom dependencies can cause the software application 220 to behave not as designed and/or expected, during deployment, and/or present operation and/or future operation of the software application 220.

In other words, phantom dependencies are dependencies that are unexpected by personnel of the developer of the software application, and phantom dependencies are typically unwelcome dependencies that can be discovered to exist within a constructed software application 220, via employment of some embodiments of the subject invention.

Referring back to FIGS. 2A-2C, the static analysis program 230, while processing (performing a static analysis of) of a portion of source code within a software application 220, is configured to identify one or more software components, for which the source code depends upon. This portion of the software application source code could be located within one of many source code files which embody the software application 220. These one or more software components, which are also referred to herein as software component dependencies, component dependencies or as dependencies, are referred to as dependencies for which the software application 220 depends upon.

For example, the Python computer programming language includes an "import" command (directive). This command is employed to import a Python module relative to the software application within which the "import" command resides within. A Python module, being a type of software component, can be constructed as a package or as a portion of a package. For example, a Python import command can be employed to import a package by a name, such as, a package that is identified by the name "Seasons", for example.

Such a package typically includes a set of software components, and typically includes a plurality of other software components, also referred to herein as package sub-components, or as sub-components, which are one or more files that each typically include computer source code or compiled source code, defining a set of one or more computer programming functions.

For example, one function within this package is identified by the name "September". In other words, the function named "September", is a component residing within another component, being the package named "Seasons", and as a result, the function named "September" can also be referred to as a function sub-component of a package component, where the package component is the package named "Seasons". That function named "September", along with other functions having other unique names (symbols), can be defined within a source code file named Autumn.py, which includes Python developed software and resides within the package named "Seasons".

As another example, the JavaScript computer programming language also includes an "import" command (directive), that can import a JavaScript package. A JavaScript package typically includes a collection (plurality) of JavaScript source code files and JavaScript functions that are defined within those JavaScript source code files, and where each of such JavaScript source code files are assigned a name (symbol) having a .js extension, and where these source code files are collectively referred to as .js files.

As another example, the Go computer programming language also includes an "import" command (directive), that can import a Go package. A Go package typically includes a collection (plurality) of Go source code files and Go functions that are defined within those Go source code files, and where each of such Go source code files are assigned, a name having a .go extension, and where these source code files are collectively referred to as .go files.

As another example, the C computer programming language includes an "#include" statement (directive), that can be employed to include a C programming language source code file. Each C programming language source code file is assigned a name having a .c extension. Such an "#include" statement can constitute a directive that can indicate a dependency upon one or more software components that are defined within the source code file including the "#include" statement.

As a result, within the context of C programming language source code, an "#include" statement can function like an import directive of another language, such as within the Python, JavaScript and Go computer programming languages. In other words, the "#include" C programming language statement (command), functions like an import directive, and is referred to herein as an "import like" directive. As referred to herein, an import like directive is a type of source code directive (statement) that functions like an import directive (statement) in that it identifies a dependency upon one or more software components that are required to construct a software application 220.

However, as referred to herein, an import like directive (statement) is not necessarily required to be assigned the name of "import". And furthermore, parameters of an import like statement are not required to be assigned a same name as the parameters of any particular one import like directive, such as in association with the import like directives of the Python, JavaScript or Go computer programming languages, for example. There import like directive parameters are also referred to herein as "characteristics" of a software component dependency of a software application 220, that is manifested (indicated) by an import like directive residing within the source code of the softw4are application 220.

In some embodiments of the invention, any information supplied by this import like directive (statement), including one or more import parameters (characteristics) of the import like directive (statement), are copied and stored within a static analysis information (SAI) file 260. There parameters This file stores static analysis related information, including software application dependency information, that is supplied by the static analysis program (SAP) 230, while performing a static analysis of the source code within the software application 220. The content of this (SAI) file 260 is designed to be accessible to and readable by the software composition accounting program (SCAP) 250, upon demand from the SCAP 250.

As designed, the software composition accounting program (SCAP) 250 inputs and reads import (like) statement information from the static analysis information (SAI) file 260, which includes software component dependency information, which is information that is stored and populated into this file 260 by the static analysis program (SAP) 230. This software component dependency information identifies one or more software component dependencies that have been identified within the source code of the software application 220, where the software application 220 is represented (expressed) as source code, and where such software component dependencies reference one or more software components that are depended upon by the software application 220. Such software components are referenced via names (symbols) that identify software packages and/or source code files and/or data files.

The SCAP 250 performs a SCAP search path search, being a search that is performed along a search path that is configured in accordance with the design of the software application build/building procedure (SABP) 240 that is employed for constructing (binding) the software application 220, the search being for any instance of a component that appears to match and satisfy at least one component dependency residing within the software application 220. For example, this search can be for any instance of a package named "Seasons", that was identified by the SAP 230, resulting from static analysis performed upon the software application 220 by the SAP 230.

A search path for this SCAP 250 performed search, referred to herein as a SCAP search path, is configurable and can be set to any and all locations within one or more file systems that are accessible to the SCAP 250, or else this search path can be restricted to one or more portions of the one or more file systems that are accessible to the SCAP 250.

Optionally and preferably, the SCAP search path is set to be the same as a search path employed by the software application build/binding) process (SABP) 240, so as to trace (mimic) and anticipate a sequence of search actions of the SABP 240, while the SABP 240 would be incorporating software components during construction of the target software application 220.

In some embodiments of the invention, the SCAP 250 is developed as a modified version of a code processor 210, that performs binding (linking) of portions of a software application into a complete software application. Such binding (linking) actions occur during the performance of a software application build procedure (SABP).

Such a SCAP design/development approach facilitates incorporation of inherent mimicking of at least some of the actions of the code processor 210, by this type of embodiment of the SACP 250. Optionally, the code processor 210 can be constructed in whole or in part, from open-source software and likewise revisions to the open-source software of the code processor 210, can facilitate development of this type of embodiment of the SCAP 250.

Like other embodiments of the SCAP 250, this type of embodiment is designed to mimic at least some of the binding (linking) actions of the code processor 210, in order to determine which software components residing within files residing along the SCAP search path at a particular point in time, are actually incorporated into a software application 220 under construction, via execution of a code processor 210, that executes within the performance of the software application build procedure (SABP) 240.

Optionally, the SCAP search can also make use of metadata that is associated with each file that is discovered (found) along this search path. Such metadata can be accessed from information that is stored as content within the file and wherein at least some of this content constitutes an application depended upon software component. Other metadata, can be obtained from the file system within which the component file is stored, such as from a Windows operating system folder that could be storing a plurality of one or more files, or from a UNIX operating system directory, that also could also be storing a plurality of one or more files.

For example, in association with the Java computer programming language, there is a Java Archive (JAR) software package file format that is typically employed to aggregate many Java class files, and other types of data and associated metadata. The JAR file can include pom.xml file, which includes information that for identifying software within the package and for identifying dependencies within that software. Note that "POM" is an acronym for project object model.

Embodiments of the invention can be configured so that the SCAP 250 searches for and identifies this type of JAR and pom.xml file combination, in response to the static analysis program (SAP) 230 performing a static analysis upon Java computer programming language source code (Java source code) residing with a software application 220.

Upon the SCAP 250 finding a JAR file and a pom.xml file within the JAR file, the SCAP 250 can extract the contents of the pom.xml file, in order to identify/verify a location of a software component that appears to satisfy (match) a set of characteristics of a software component dependency, that is associated with a Java import or import like statement, residing within the Java source code of the software application 220.

In general, the operation of the SCAP 250 is configured to determine what particular software components can be found residing along the SCAP search path, while mimicking the operation (actions) of the SABP 240. The SCAP 250, in possession of a set of one or more found software components, determines which software components that are found along the SCAP search path are appropriate for incorporation into the target software application 220, via the software build procedure (SABP) 240, based upon the characteristics of each of the software components found.

For example, in one use scenario, the SCAP 250 is searching for software components that could each satisfy (match) at least one software component dependency that is identified (characterized) within a list of software component dependencies. A software component dependency is characterized, at least in part, by parameters (characteristics) of an import like directive that is associated with the software component dependency, and that resides within the source code of a software application 220. One such software component dependency within this list of dependencies is satisfied by a function named Summer having associated parameters (int X, int Y, int Z), and this function is known from static analysis information (SAI) 260 by the SCAP 250 to be supplied within a package named "Seasons".

If the SCAP 250 finds a software component that includes the function named Summer with the associated parameters (int X, int Y, int Z), then this software component appears to satisfy at least one software component dependency, within this list of dependencies for which the SACP 250 is searching for.

However, if this function named Summer does not appear to supplied within any known installed package residing along the SCAP search path, then this found software component appears have characteristics that are inconsistent and unexpected, in relation to the software component dependency information within the SAI 260, where such information was determined from a static analysis of the source code of the software application 220 under construction.

Preferably, the SCAP 250 is configurable to flag this particular software component dependency as being abnormal, because the SCAP search path found software component, that technically satisfies this particular software component dependency, has characteristics that are inconsistent with the characteristics of the associated software component dependency, as indicated by an import like directive that was processed via a static analysis of the source code of the software application 220.

Alternatively, if this function named Summer does appear to be supplied within a package named "Climate", but does not appear to supplied within a package named "Seasons", then this found software component appears have characteristics that are inconsistent and unexpected, in relation to software component dependency information within the SAI 260, where such information was determined from a static analysis of the source code of the software application 220 under construction.

Preferably, the SCAP 250 is also configurable to flag this particular software component dependency as being abnormal, because the SCAP search path found software component, that technically satisfies this particular software component dependency, has characteristics that are inconsistent with the characteristics of the associated software component dependency, as indicated by an import like directive that was processed via a static analysis of the source code of the software application 220.

Or, if this function named Summer does appear to be supplied within a package named "Seasons", but there is at least one other software component residing along the SCAP search path, that also appears to supply this same function, then this set of more than one software components appears have characteristics that are inconsistent and unexpected, in relation to information stored within the SAI 260, where such information was determined from a static analysis of the source code of the software application 220 under construction.

Otherwise, if the search performed by the SCAP 250 finds one and only one software component along the SCAP search path that satisfies an associated software component dependency, and that appears to be supplied by a package manager within a package named "Seasons", then this software component appears to satisfy (match) a software component dependency being searched for by the SACP 250.

The SCAP 250 is designed to flag this particular software component dependency as being normal, because the one and only one SCAP search path found software component, that technically satisfies this particular software component dependency, has characteristics that are consistent with the characteristics of the associated software component dependency, as indicated by an import like directive that was processed via a static analysis of the source code of the software application 220.

A software component that appears to be supplied by a package manager, is located inside of the scope of operation of a package manager that is expected to be associated with the supplying (delivery) of the software component. As a result, this dependency is classified as being a normal (regular) dependency, as opposed to being classified as being an abnormal dependency, in accordance with the invention.

A software component satisfying a software component dependency will be indicated as being a SCAP search path found software component, given that it is found via a SCAP search path search of non-volatile (file system) stored data. This found software component, also referred to herein as a found component, that satisfies a SAI file stored software component dependency, will be encoded as data within a set of file system found component dependency information (FSFDI) 270, being associated with the software application (SA) 220. This data will encode a unique file system identifier and an associated full file system path of a file including content satisfying a software component dependency, of the software application 220.

The software composition accounting program (SCAP) 250 determines what software component dependencies are incorporated into the target software application 220, and determines where such component dependencies reside within the one or more file systems of the non-volatile data storage 140, via the information stored within the file system found dependency information (FSFDI) file 270, and further encodes and stores this information as data within a software composition (analysis) information (SCI) file 280. Information stored within the (FSFDI) file 270 is stored as a result of the searching of the one or more file systems in accordance with a SCAP search path, where such software components are found to reside.

This software application incorporated component dependency information will be encoded as data within a software composition (analysis) information (SCI) file 280, also referred to herein as a software composition (analysis) information (SCI) data file 280. This data will encode within the SCI file 280, a file system file path of a found file including the software application incorporated software component. This file path information is also stored within the file system search/found (component) dependency information (FSFDI) file 270, if found via a SCAP search along the SCAP search path.

Alternatively, if a search performed by the SCAP 250 finds any instance of a component, for example, a package named "Seasons", that is located within the SCAP search path that is configured for the software application build/binding procedure (SABP) 240, but located away from a scope of normal operation of a package manager, and finds no other package named Seasons that is located inside of the scope of operation of any of the one or more package managers that would be associated with the package names "Seasons", then this software component dependency of the software application 220 upon the package named Seasons, does not appear to be a package manager supplied component to the software application 220. As a result, this component dependency of the software application 220, is classified as being abnormal (irregular), as opposed to being classified as normal (regular), in accordance with the design of the invention.

In some circumstances, such a found software component may be in fact, a revised version of a package manager supplied component, that is now being processed by the SABP 240 in a similar manner as in-house developed software. Further investigation may be required to determine whether such a type of dependency upon a software component by the software application 220, is known (expected) by and/or desired by personnel of the organization of the software developer. If this abnormal dependency is unknown to such personnel, then is also considered to be a phantom dependency.

Alternatively, if a search performed by the SCAP 250 finds multiple software components, that appear to satisfy a software component dependency, within the search path that is configured for the software application build/binding procedure (SABP) 240, whether these instances of software components appear to be package manager supplied or not, then satisfaction of this software component dependency appears to be inconsistent with and unexpected, in relation to information stored within the SAI 260, where such information was determined from a static analysis of the source code of the software application 220 under construction.

Preferably, the SCAP 250 is configurable to classify this circumstance as being an abnormal dependency residing within the software application 220. If this type of abnormal dependency is unknown to personnel within the organization of the software developer, then it is further classified as being phantom dependency.

Figure 4A:
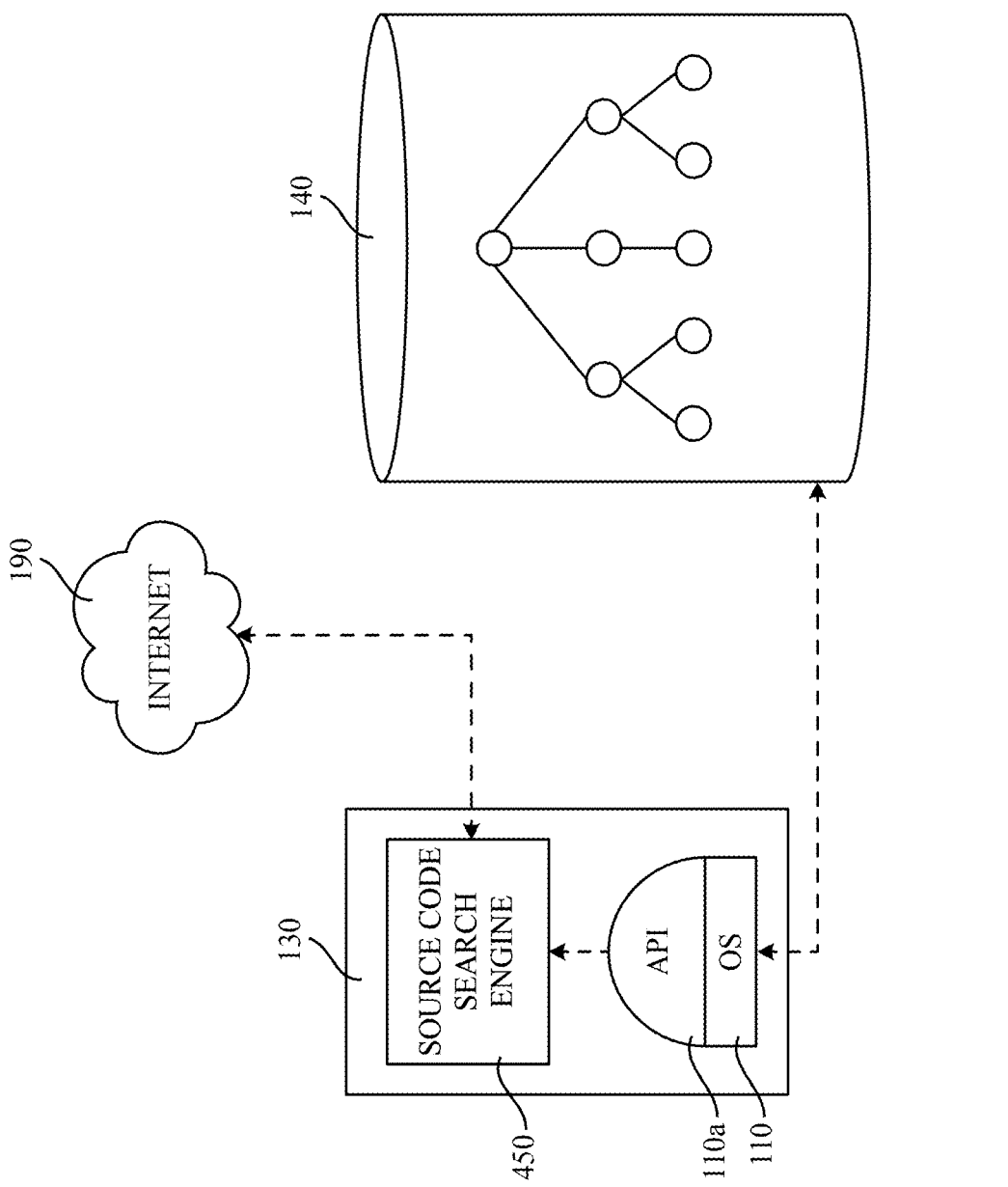
FIGS. 4A-4B are each a simplified block diagram illustrating operation of a global source code search engine and a semantic hash code algorithm that can be employed for performing a search for same or similar instances of source code.

FIG. 4A is a simplified block diagram illustrating operation of a source code search engine 450. The source code search engine 450 is designed to search for source code that has matching or similar source code characteristics as that of an instance of target source code. Such source code characteristics being also referred to herein as target source code characteristics. Such matching is also referred to herein as a matching scheme. The instance of source code, also referred to herein as target source code, being for example, a source code file including source code content of unknown origin, or of an unknown version, or including source code defining a function where the content of the source code file is of unknown origin and/or version.

In one embodiment, characteristics of a target source code, can be extracted and quantified into a set of numerical values that correspond with a first set of one or more embeddings, where each of these embeddings is a mathematical representation of one or more of such target source code characteristics of a selected instance (body) of source code. Such a selected instance of source code, is also referred to herein as target source code, or as selected source code, or as source code of interest. Source code can also be referred to herein as source code data.

Instances of source code data, other than the above referred to selected instance of (target) source code, can each also be characterized and quantified and associated with a respective set of numerical values that correspond to the first set of one or more embeddings, in a same manner as that of the above referred to selected instance of (target) source code. Each set of embeddings that are computed (quantified) in association with each of multiple instances of source code can be mapped into a multi-dimensional vector space.

The aforementioned characteristic matching scheme, is implemented by an algorithm, which is generally characterized and referred to herein as a semantic hash algorithm. This semantic hash algorithm, as described herein, involves a mapping of a set of embeddings into the multi-dimensional vector space, and is designed so that the more different instances of source code are to each other, with respect to their set of embeddings, representing their quantified and associated source code characteristics, the more proximate their associated set of embedding values (numerical values) are to each other, while located within a multi-dimensional vector space.

This type of algorithm, can be implemented via methods employed within the field of artificial intelligence. In fact, a large population of source code instances, can each be characterized and quantified via a respective set of embeddings (numerical values) that are computed and stored into a data repository, which can be implemented as a structured data base. Each of this large population of source code instances can be searched for and found via the Internet 190, for example.

In some embodiments, the source code search engine 450 employs the above-described source code characterization scheme, preferably implemented via a semantic hash algorithm, to identify similar and/or matching instances of source code with respect to a selected instance of target source code. For searched for source code to be a considered as a similar or matching instance of source code, relative to a selected instance of target source code, the searched for source code must be expressed by a same computer programming language as that of the target source code.

Once the source code search engine 450 finds a similar or matching instance of source code, referred to herein as searched for source code, relative to that of a selected instance of target source code, the context of that searched for and found instance of source code can lead to determining the identity of the origin and/or the version of that found instance of source code, referred to herein as being supplemental information associated with the found source code, and such supplemental information can also be relevant to the selected instance of target source code.

For example, the searched for and found instance of source code might be found inside of an open-source code repository, where the found instance of source code is labeled with a variety of associated information, such associated information constituting supplemental information that is associated with the found instance of source code, and including such as the identify of its developer (origin) and its version, inclusion or referencing of licensing information, and of the existence of other versions of the source code, characteristics of one or more versions of the source code, software developer reviews of one or more versions the source code, etc.

Where available, metadata that is associated with the instance of source code, can be read from the file system and/or from the file including the instance of source code, to harvest further supplemental information that may be associated with the found instance of source code.

Figure 4B:
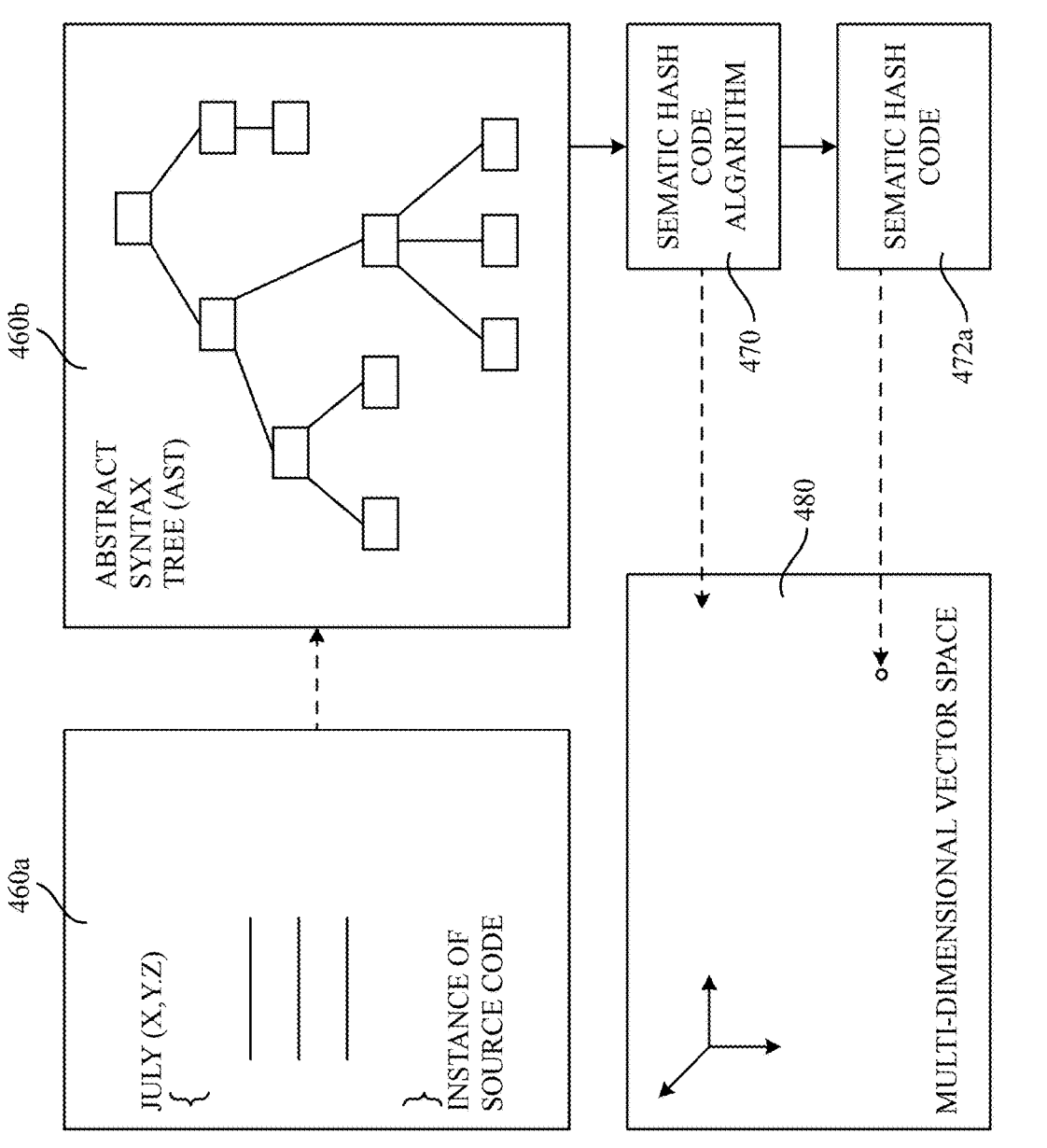

FIG. 4B is a simplified block diagram illustrating employment of a semantic hash code algorithm to aid with identifying same or similar instances of source code. As shown, an instance of source code 460a, defines a function. The function is a JavaScript computer programming language defined function, which is named "July" and that is designed to be called with three arguments, (parameters). These arguments (parameters) are named "X", "Y", and "Z".

A program, such as a modified version of a static analysis program (SAP) 230, is designed to construct an abstract syntax tree (AST) 460b that represents the instance of source code that embodies this function. A semantic hash code algorithm 470 processes the abstract syntax tree (AST) 460b and generates a semantic hash code (value) 472a, that represents the function named July 460a and that is computed from the abstract syntax tree (AST) 460b that also represents the function named July. The semantic hash code value 472*a*, is then plotted into a multi-dimensional vector space 480 so that it resides at a location within the multi-dimensional vector space 480.

Ideally, this semantic hash algorithm is designed so that any similarity between two separate instances of source code is represented by a relative proximity between two separate and respective semantic hash codes (hash code values), that each represent those two separate instances of source code, while these two separate semantic hash code values are plotted into and located within, this multi-dimensional vector space 480. Note that this multi-dimensional vector space 480, can be designed to represent 10+, a 100+ or even a 1000+ dimensions. Such a plurality of dimensions, and well beyond three dimensions, far exceeds a multi-dimensioned space that a human can visualize.

In one embodiment of the invention, target source code defining a function that is of uncertain origin is identified and analyzed in the following manner. An abstract syntax tree (AST) 460*b* of this target source code 460*a* is constructed via a static analysis program (SAP) 230. An AST 460*b* is s tree like representation of source code 460*a* that is produced based upon an analysis of source code. The analysis of the source code being preferably performed by static analysis program (SAP) 230. However, in other embodiments, such analysis can be performed by a code processor program 210, such as by a compiler program or by an interpreter program.

The structure and content of an abstract syntax tree (AST) 460*b* is generated from computer programming language source code, and as a result the AST 460*b* is designed to represent a structure of the computer programming language source code. The generation of the AST 460*b* is designed to not be dependent upon the particular formatting of the source code, nor is it dependent upon information stored within a source code file, other than the source code.

For example, source code comment text (comments), also referred to as "comments" in proximity to the source code within a source code file, are ignored for the purpose of generating an AST 460*b*, for example. The structure and content of an AST 460*b* can be analyzed and transformed into a representation within a multi-dimensional vector space. Specifically, a plurality of separate measurements of the AST 460*b* are performed and plotted into a multi-dimensional vector space.

For example, the abstract syntax tree (AST) 460*b* can be measured with respect to a number of nodes falling into each of one of a plurality of node type categories, and a number of tokens falling into each of one of a plurality of token type categories. For example, the number of nodes, number of nodes having one and only one child node, number of nodes having two and only two child nodes etc., within an AST 460*b*, each represent a number of one and only one dimension within a multi-dimensional vector space. Likewise, a number of tokens falling into each of one of a plurality of token type categories, can each be represented by a number that constitutes one and only one dimension within a multi-dimensional vector space.

Using the above-described approach, a vector space of for example, at least 4 or more dimensions can be populated (plotted) with hash code values that are each computed from a respective each of a plurality of instances of ASTs 460*b*, where each AST 460*b* is measured in accordance with respect to at 4+ measurements that employed to compute a semantic hash code value, that is are plotted into a vector space 480 that is designed to accommodate at least those 8+dimensions, respectively.

A first semantic hash code value representing a first instance of source code via measurements of its respective AST 460*b*, and that is located proximate to another second hash code value that is representing another second instance of source code, via its respective AST, is said to be representing the first instance of source code that is similar to the other second instance of source code that is represented by the other second semantic hash code value.

Also, in circumstances where the first and second instances of source code are identical to each other, then the first and second semantic hash code values are also identical (equal) to each other, and regardless of whether each of these instances of source code are accompanied by differing comments sections within a source code file, and/or are formatted differently within each respective source code file, via varying lengths of spacing between portions of each instance of source code, for example.

Also, in circumstances where first and second semantic hash code values are identical (equal) to each other, then the respective and corresponding first and second instances of source code may be identical to each other, ignoring differing comment sections and/or different formatting between the first and second instances of source code, or else may be closely similar to each other, as indicated by having an identical (equal) first and second hash code values.

Such an above-described semantic hash algorithm, can help to more efficiently and effectively identify same or similar instances of source code, to better identify vulnerabilities of those instances of source code, within a software application 220, under construction.

In summary, the invention provides a computer implemented method for identifying dependencies from a software application to third-party software components. This method includes the actions of performing a static analysis of source code, the source code constituting at least a portion of a software application, and while performing the static analysis, searching for and identifying one or more directives from within the source code that indicate a one or more dependencies from the software application to one or more software components.

And further, the method performing a search of non-volatile data storage including at least one or more file systems, the search being directed along a search path that is in accordance with a software application binding procedure (SABP) for the software application, and where the SABP is employed for constructing said software application; and identifying along the search path, one or more found software components, each of the found software components having one or more associated characteristics that are indicative of satisfying at least one of the dependencies, the dependency being upon at least one software component. The software component could be a third-party provided software component, or a software component provided by other than a third-party.

In another aspect, the above referred to method further identifying among the one or more of the found software components, one of more of the found software components that also are bound into the software application during the binding procedure that is employed for constructing the software application.

In another aspect, the above referred to method further identifying among the one or more of the found and bound software components, one or more of the found and bound software components that are indicated as not being supplied to the software application via a package manager.

In another aspect, the above referred to method further identifying among the one or more of the found software components, one of more of the found software components that are not bound into the software application during the binding procedure that is employed for constructing the software application.

In another aspect, the above referred to method where the directives include an import statement within source code in accordance with at least one of the Java, Python, Go or JavaScript computer programming languages.

Further in summary, the invention also provides a system for identifying and classifying dependencies from a software application to one or more third-party software components. The system including a static analysis program that is configured for performing a static analysis of source code, the source code constituting at least a portion of a software application, and the static analysis program further configured for identifying one or more directives from within the source code that indicate one or more dependencies of software application to one of more third party components; and further configured for outputting information regarding the dependencies within a set of static analysis information.

The above referred to system further providing a software composition accounting program that is configured for inputting the at least a portion of the set of static analysis information and configured for performing a search of non-volatile data storage including at least one or more file systems, the search being for one or more found components, the found components each being a component having one of more associated characteristics that indicate satisfaction of at least one the dependencies of the software application, the search being directed along a search path that is in accordance with a software application binding procedure that is employed for constructing the software application.

In another aspect, wherein said software composition accounting program is further configured for determining which of the found components are also found and bound components with respect to incorporation into the software application.

In another aspect, wherein the software composition accounting program is further configured for determining which of the found components are also found and bound components with respect to incorporation into the software application.

In another aspect, wherein the software composition accounting program is further configured for determining which of the found and bound components are not being provided by a package manager.

In another aspect, wherein the software composition accounting program is further configured for outputting software composition analysis information including classification of components with respect to whether the components are found and/or bound and/or supplied by a package manager.

Further in summary, the invention also provides a system for identifying same or similar instances of source code. The system including a data repository designed for storing information regarding one or more associations between an instance of source code and a semantic hash code value; and wherein the semantic hash code value being determined in accordance with a semantic hash code algorithm; and wherein the semantic hash code algorithm being designed for computing a quantification of a set of measured characteristics of said instance of source code; and wherein the quantification of the set of source code characteristics of the instance of source code being represented by the semantic hash code value, the semantic hash code value corresponding to the instance of source code; and wherein an association between an identity of the instance of source code and the semantic hash code value is stored into the data repository.

In another aspect, the above referred to system wherein the semantic hash code algorithm processes an abstract syntax tree (AST) corresponding to the instance of source code.

In another aspect, wherein the semantic hash code value is computed from a plurality of measured characteristics of the abstract syntax tree (AST).

In another aspect, wherein the data repository is designed to store a plurality of associations, and wherein each of the associations represents an association between an identity of a unique instance of source code, and a semantic hash code value corresponding to the unique instance of source code.

In another aspect, wherein the unique instance of source code is included within a source code file, and wherein an association between said unique instance of source code and a semantic hash code value corresponding to the unique instance of source code, further includes a name and a location of the source code file.

In further summary, the invention provides for a computer-implemented method for analyzing a dependency upon a software component within a software application, the software component including computer programming language source code, the method including the actions of executing a semantic hash algorithm upon a first instance of source code, being a target instance of source code, and computing a first semantic hash code value in association with the first instance of source code, in accordance with a first semantic hash algorithm, and computing a second semantic hash code value in association with a second instance of source code, in accordance with the semantic hash algorithm, and comparing the first semantic hash code value and the second semantic hash code value; and determining if the first hash code value is equivalent to the second hash code value, and storing an association of the second instance of source code with the first instance of source code within a data repository, in response to each instance of source code having an equivalent semantic hash code value.

In another aspect, the above referred to method, wherein the semantic hash algorithm processes an abstract syntax tree (AST) corresponding to an instance of source code.

In another aspect, wherein the semantic hash algorithm processes an abstract syntax tree (AST) corresponding to an instance of source code.

In another aspect, wherein a semantic hash value for an instance of source code, is determined based upon a plurality of measured characteristics of an abstract syntax tree (AST) corresponding to the instance of source code.

In another aspect, wherein the measured characteristics of the abstract syntax tree (AST) include a number of nodes within the abstract syntax tree (AST) falling into each one of a plurality of node type categories.

In another aspect, wherein an instance of source code is included within a source code file, and wherein an association between a semantic hash code value corresponding to the instance of source code, includes at least one of a name of the source code file, and a location of the source code file.

This written description uses example embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

PARTS LIST 110 operating system
110a application programming interface (API) of operating system 110
120 package manager (PM)
130 computer system
140 non-volatile media
190 Internet
210 code processor
220 software application (SA)
230 static analysis program (SAP)
240 software application build/binding procedure (SABP)
250 software composition accounting program (SCAP)
340 not found, but bound and not package manager supplied components
342 found and bound and package manager supplied components
344 found and bound and other than package manager supplied components
346 found, but not bound and package manager supplied components
348 not found, but bound and package manager supplied components
350 search path found components
360 package manager supplied component dependencies
370 software application incorporated (bound) components
380 abnormal component dependencies
450 source code search engine
460a instance of source code
460b abstract syntax tree (AST) representing instance of source code 460a
470 semantic hash code algorithm
472 semantic hash code (value)
472a semantic hash code (value) representing instance of source code 460a
480 multi-dimensional vector space

The invention claimed is:

1. A system for identifying abnormal dependencies from a
software application of third-party software components that are erroneously left out of the software application, by identifying same or similar instances of source code in the software application to identify the third-party software components that are not bound into the software application, the system including:
a data repository designed for storing information regarding associations between an instance of the source code for the software application and a semantic hash code value;
wherein said semantic hash code value is determined in accordance with a semantic hash code algorithm that identifies a quantification of a set of measured characteristics of said instance of the source code;
wherein characteristics of said instance of the source code are represented by said semantic hash code value; and
wherein an association between an identity of said instance of source code and said semantic hash code value is stored into said data repository;

a non-volatile data storage that stores the software application and other data including information regarding the source code in the software application;
a source code search engine employed to perform a search for instances of the source code, residing outside of the software application, that are matching or that are similar to that of an instance of a target source code, via employment of the semantic hash algorithm; and
a processor controlled by code stored in the non-volatile data storage which when executed by the processor in conjunction with execution of the source code search engine causes performance of the following operations:
performing by the source code search engine a search through the non-volatile data storage to identify directives from within said source code using the semantic hash algorithm to identify dependencies from the software application;
identifying among the third-party software components those that are not identified and bound into the software application as found software components with abnormal dependencies that are erroneously left out of the software application;
updating the software application to correct the software application to include the found software components by storing the found software components as part of the software application and further storing data to identify the found software components as being part of the software application.

2. The system of claim 1, wherein said semantic hash code algorithm processes an abstract syntax tree (AST) corresponding to said instance of source code.

3. The system of claim 2 wherein said semantic hash code value is computed from a plurality of measured characteristics of said abstract syntax tree (AST).

4. The system of claim 1 wherein said data repository is designed to store a plurality of associations, and wherein each of said plurality of associations represents an association between an identity of a unique instance of source code, and a semantic hash code value corresponding to said unique instance of source code.

5. The system of claim 4 wherein said unique instance of source code is included within a source code file, and wherein an association between said unique instance of source code and a semantic hash code value corresponding to said unique instance of source code, further includes a name and a location of said source code file.

6. A computer-implemented method for identifying third-party software components that are erroneously left out of a software application, the third-party software components including computer programming language source code, the method including the actions of:
executing a semantic hash algorithm upon a first instance of source code, being a target instance of source code;
computing a first semantic hash code value in association with said first instance of source code, in accordance with a first semantic hash algorithm;
computing a second semantic hash code value in association with a second instance of source code, in accordance with said semantic hash algorithm;
comparing said first semantic hash code value and said second semantic hash code value and determining if said first semantic hash code value is equivalent to said second semantic hash code value;
storing an association of said second instance of source code with said first instance of source code, within a data repository, in response to each instance of source code having an equivalent semantic hash code value identifying that the first instance of source code has an equivalent semantic hash code value stored in the data repository and is among third-party software components not identified and bound into the software application as a found software component that was erroneously left out of the software application;

updating the software application to correct the software application to include the found software component by storing the found software component as part of the software application.

7. The method of claim 6, wherein said semantic hash algorithm processes an abstract syntax tree (AST) corresponding to an instance of source code.

8. The method of claim 7, wherein a semantic hash value for an instance of source code, is determined based upon a plurality of measured characteristics of said abstract syntax tree (AST) corresponding to said instance of source code.

9. The method of claim 8 wherein said plurality of measured characteristics of said abstract syntax tree (AST) include a number of nodes within said abstract syntax tree (AST) falling into each one of a plurality of node type categories.

10. The method of claim 7 wherein an instance of source code is included within a source code file, and wherein an association between a semantic hash code value corresponding to said instance of source code, includes at least one of a name of said source code file, and a location of said source code file.

\* \* \* \* \*